June 18, 1935. E. F. PILGER 2,005,202
UNIVERSAL JOINT
Filed May 27, 1932
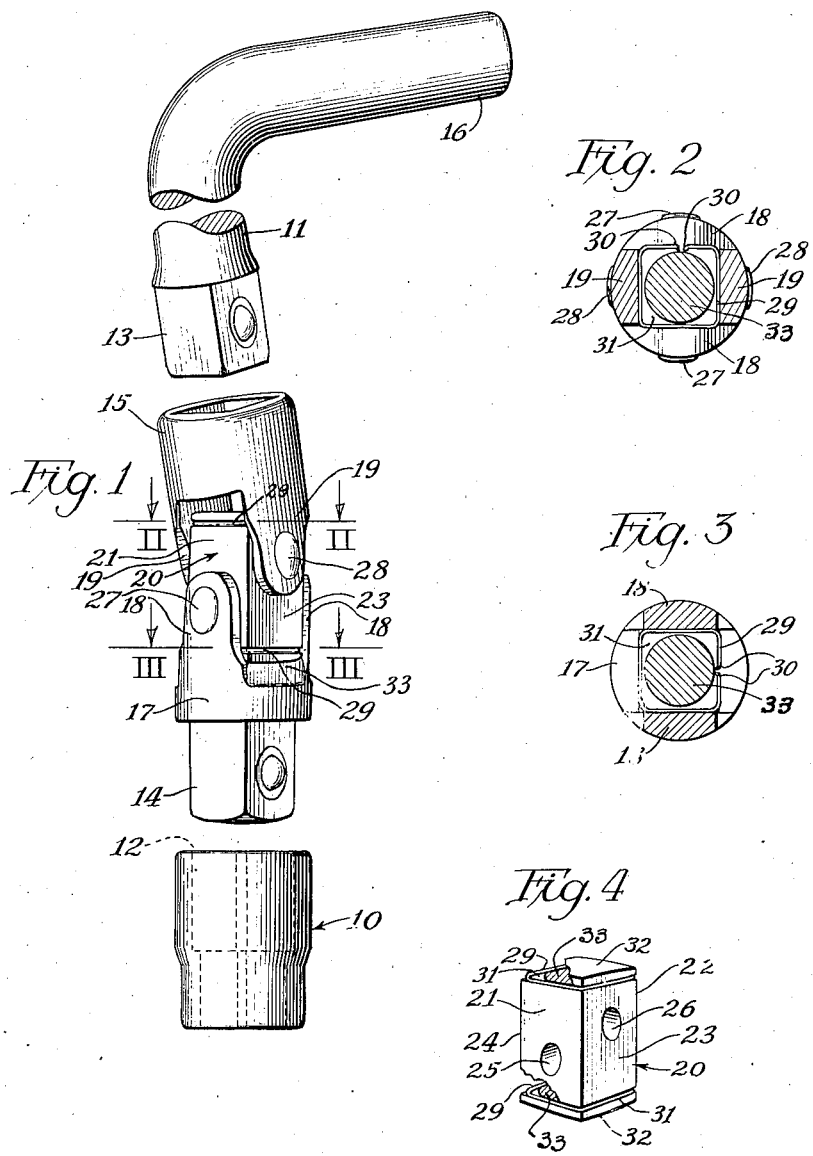
Inventor:
Emil F. Pilger
By Harry C. Alberts
Atty.

Patented June 18, 1935

2,005,202

UNITED STATES PATENT OFFICE 2,005,202

UNIVERSAL JOINT

Emil F. Pilger, Kenosha, Wis., assignor to Snap-On Tools, Inc., Kenosha, Wis., a corporation of Delaware Application May 27, 1932, Serial No. 613,808

6 Claims. (Cl. 64—102)

This invention relates to universal joints and more particularly to wrench handles, although certain features thereof may be employed with equal advantage for other purposes.

It contemplates more especially the provision of a novel universal joint having means associated therewith to maintain the complemental parts in adjusted angular relation.

Universal joints have long been resorted to as a desirable connecting expedient between two members having variable positions, but the relative movement must be sufficiently free to enable the effective use thereof. This free movement is sometimes undesirable owing to the lack of rigidity between the connected members and the inability to maintain such in adjusted position. In nut turning, universal joints have been utilized in conjunction with handle means to enable access to restrictive locations. The inability of maintaining the complemental parts in adjusted relation, however, has proven very annoying and disadvantageous so that freedom of movement as well as connection rigidity are requisite features in nut turning devices such as wrenches.

One object of the present invention is to simplify the construction and improve the operation of devices of the character mentioned.

Another object is to provide an improved universal joint which enables free movement and sufficient rigidity to maintain the parts in adjusted positions.

Still another object is to provide a universal joint of novel and simple construction which enables the maintenance of the connected parts in adjusted angular positions.

A further object is to provide a universal joint having the connected block thereof provided with spring means for maintaining the parts in adjusted positions.

A still further object is to provide a universal joint having a connecting block provided with circumferential grooves for retaining spring members establishing frictional contact between the relatively adjustable parts.

Still a further object is to provide a wrench handle having a universal joint with resilient means for maintaining the parts thereof in angular adjusted relation.

Other objects and advantages will appear from the following description of an illustrative embodiment of the present invention.

In the drawing:

Figure 1 is a perspective view of a device embodying features of the present invention, there being rod members detachably associated therewith to disclose the auxiliary members utilized therewith.

Figure 2 is a sectional view taken substantially along line II—II of Figure 1.

Figure 3 is a sectional view taken substantially along line III—III of Figure 1.

Figure 4 is a perspective view of the connecting block embodied in the structure disclosed in Figure 1.

The structure selected for illustration comprises a socket member 10 and a rod member 11 intended for operative connection to a universal joint to be hereinafter described, the former being provided with an opening 12 and the latter with a polygonal extremity 13 for detachable connection with complemental members or parts 14 and 15, respectively, of a universal joint. The rod member 11 may be provided with a suitable handle member 16 to enable the convenient turning thereof together with the parts detachably connected therewith as will presently appear. The part 14 has an enlarged cylindric extension 17 provided with furcations 18. The socket part 15 of the universal joint is also of cylindrical configuration, and it terminates in furcations 19 shaped and spaced to correspond with the furcations 18 for the reception of a connecting block 20 therebetween as will appear more fully hereinafter.

The connecting block 20 is preferably provided with an exterior configuration which imparts a substantially square cross-section thereto so as to define parallel sides 20—22 and 23—24 constituting the exterior thereof. The connecting block 20 is sufficiently elongated to enable the reception thereof between the furcations 18 and 19 which are spaced to correspond with the dimensional extent between the sides 21—22 and 23—24 thereof. The connecting block 20 is provided with apertures 25 and 26 extending transversely through the sides 21—22 and 23—24, respectively, in normally related directions, these being off-set from a transverse median line to avoid intersection and enable the connection of the furcations 18 and 19 to the block 20. This is effected by means of pivotal pins 27 and 28 which extend through the apertures 25 and 26, respectively, and between the furcations 18 and 19 to effect a joinder therebetween. To this end, the heads of the pins 27 and 28 are swaged to preclude removal and enable pivotal movement of the parts 14 and 15 in right-angular directions relative to the connecting block 20.

Parts 14 and 15 are freely movable in right-angular directions relative to the connecting block 20, and are arranged to enable the connected parts to assume angular positions. In the present embodiment, the universal joint parts 14 and 15 are maintained in adjusted angular relation by spring means comprising wires 29, in this instance two, which are bent to define a ring member having parallel sides corresponding substantially with the cross section of the connecting block 20. The wire members 29 have the ends 30 thereof substantially in confronting relation to define a split ring, these being bent inwardly for confinement in circumferential grooves 31 provided in the connecting block 20. The circumferential grooves 31 are turned or otherwise formed in the connecting block 20 proximate to the extremities 32 thereof to enable the lodgement of the split spring members 29 therein to present sides corresponding with those of the connecting block 20.

As a result, opposed parallel sides of the spring members 29 engage the reduced interior axial body 33 defined by the grooves 31 so as to present the wires 29 slightly beyond the surfaces of the connecting block 20 for frictional contact with the confronting surfaces of the furcations 18 and 19. Accordingly, the resiliency of the wires 29 serves to establish frictional engagement to preclude free movement of the connected parts 14 and 15 except in the response to manual adjustment. The frictional contact established between the furcations 18—19 and the connecting block 20 through the medium of the spring members 29, is such as to preclude accidental relative displacement therebetween.

In effect, a rigid connection is available for predetermined angular adjustment to enable the registry of the socket 10 or other attachment with a nut, bolt head or cap screw not ordinarily accessible. This is important, for it is exceedingly advantageous in effecting immediate registry by pre-adjustment of the angular relation of the universal joint elements 14 and 15 to avoid the obstruction and effect registry with the normally inaccessible parts with a wrench socket, screw driver head or other tool. Once the tool is in registry with the part to be turned, the springs 29 offer no resistance to or interference with the normal universal joint movement. Varied right-angular adjustments within a wide range to offer the advantages of a flexible universal joint with the preferred characteristics of a rigid connection, are thus available. It is to be noted that part member 14 telescopically receives the wrench socket 10 so that detachment is instantaneous for accommodating other sized sockets or tools manipulated responsive to the handle member 16. This enables the connected detachment in accordance with well established practice and enlarges the utility of the tool.

Various changes may be made in the embodiment of the invention herein specifically described without departing from or sacrificing any of the advantages of the invention as defined in the appended claims.

I claim:

1. In a device of the character described, the combination with spaced members having bifurcated extremities, of a block interposed between said bifurcated member extremities, pivot pins extending in normal directions through said block and each of said bifurcated extremities to connect said members for movement in right angular directions, said block having a circumferential groove provided therein, and a spring lodged in said groove for frictional contact with the member extremity to maintain any adjusted relation therebetween.

2. In a device of the character described, the combination with spaced members having bifurcated extremities, of a block interposed between said bifurcated member extremities, pivot pins extending in normal directions through said block and each of said bifurcated extremities to connect said members for movement in right angular directions, said block having circumferential grooves formed in said block, and wire spring means mounted in said grooves for frictional contact with each of said furcated member extremities to maintain the adjusted angular relation therebetween.

3. In a device of the character described, the combination with spaced members having bifurcated extremities, of a block interposed between said bifurcated member extremities, pivot pins extending in normal directions through said block and each of said bifurcated extremities to connect said members for movement in right angular directions, said block having circumferential grooves formed in said block, and rectangular wire springs mounted in said grooves to frictionally contact with said member extremities to maintain the angular adjusted relation thereof.

4. In a device of the character described, the combination with spaced members having bifurcated extremities, of a block interposed between said bifurcated member extremities, pivot pins extending in normal directions through said block and each of said bifurcated extremities to connect said members for movement in right angular directions, said block having circumferential grooves formed therein, and wires bent to substantially correspond with the configuration of said block for retention in said grooves to frictionally retard the pivotal movement of said members relative thereto.

5. In a device of the character described, the combination with spaced members having bifurcated extremities, of a block interposed between said bifurcated member extremities, pivot pins extending in normal directions through said block and each of said bifurcated extremities to connect said members for movement in right angular directions, said block having circumferential grooves formed therein, and split wire ring members in said grooves to frictionally contact with said member extremities to maintain the adjusted relation therebetween.

6. A universal joint for socket wrenches and analogous constructions comprising two end members and an intermediate member, means providing a pivotal connection between each end member and the intermediate member the axes of which pivotal connections are at substantially right angles to each other, and means establishing a frictional engagement between the members to frictionally hold the members in any adjusted position yet enabling them to function as a universal joint.

EMIL F. PILGER.